United States Patent [19]
Rance

[11] Patent Number: 4,506,051
[45] Date of Patent: Mar. 19, 1985

[54] WATER-IN-OIL EMULSIONS HAVING IMPROVED LOW TEMPERATURE PROPERTIES

[75] Inventor: Robert W. Rance, Bühl, Fed. Rep. of Germany

[73] Assignee: Dow Chemical Rheinwerk GmbH, Midland, Mich.

[21] Appl. No.: 530,794

[22] Filed: Sep. 9, 1983

[51] Int. Cl.$^3$ .............................................. C08K 5/20
[52] U.S. Cl. .................................... 524/233; 524/230
[58] Field of Search ...................... 524/233, 230, 366; 526/220

[56] References Cited
U.S. PATENT DOCUMENTS
4,391,932  7/1983  Tai ....................................... 524/801

Primary Examiner—J. L. Schofer
Assistant Examiner—J. M. Reddick
Attorney, Agent, or Firm—P. D. Sheperd

[57] ABSTRACT

The low temperature properties (i.e., the stability of the emulsion upon repeated freeze-thaw cycles and/or the fluidity of the emulsion at low temperatures such as −20° C.) of a self-inverting water-in-oil emulsion of a water-soluble polymer are improved by incorporating an N,N-dialkyl amide in the emulsion.

9 Claims, No Drawings

WATER-IN-OIL EMULSIONS HAVING IMPROVED LOW TEMPERATURE PROPERTIES

BACKGROUND OF THE INVENTION

The present invention relates to water-in-oil emulsions of a water-soluble polymer, particularly to water-in-oil polymeric emulsions containing an N,N-dialkyl amide of an aliphatic compound.

Various water-soluble polymers such as copolymers of acrylamide and acrylic or methacrylic acid are useful in a variety of applications such as enhanced or secondary oil recovery of petroleum, flocculation of finely divided solids from aqueous suspensions such as sewage, plating waste and potable water, and the like. These water-soluble polymers are often advantageously prepared as water-in-oil emulsions, i.e., a dispersion of polymer containing water droplets in a continuous oil phase. In use, the water-in-oil polymeric emulsion is inverted, such as by the addition of the emulsion to water, to allow the polymer to dissolve in the now continuous water phase and impart a coincident viscosity increase.

Heretofore, to facilitate the inversion of the water-in-oil emulsion and/or dissolution of the water-soluble polymer, it has been proposed to increase the overall HLB of the water-in-oil emulsions. Specifically, although the polymer emulsions are prepared using a surfactant (e.g., an emulsifier which is commonly soluble in the continuous oil phase) such emulsifiers are often not of a sufficiently high HLB value to effectively cause the inversion of the polymeric emulsion in water, particularly in the sea or salt water normally encountered in secondary oil recovery operations.

One method which has been proposed to increase the overall HLB of the emulsion involves reducing the amount of the low HLB emulsifiers employed in the preparation of the water-in-oil emulsion. Alternatively, it has been proposed to employ, as the emulsifier used in the preparation of the water-in-oil emulsion, a surfactant having as high as possible HLB value. Unfortunately, these methods have met with limited success since the amounts and/or HLB value of the emulsifiers employed in the preparation of the emulsion are limited by the requirement that a water-in-oil emulsion must initially be prepared.

Alternatively, to facilitate the inversion of the water-in-oil emulsions and/or the dissolution of the polymer in water, a surfactant having a higher HLB value, a so-called inverting surfactant, has often heretofore been added to the previously prepared emulsion to increase the overall HLB value of the emulsion. This so-called inverting surfactant is particularly necessary to effectively invert the emulsion in the sea or salt waters normally encountered in secondary oil recovery operations.

Unfortunately, the formulated water-in-oil emulsions having the required HLB value for effective inversion in sea or salt water are often not sufficiently fluid to readily flow at low temperatures and/or severe problems are often experienced if the formulations are subjected to repeated freeze-thaw cycling.

In view of these deficiencies in the prior art, it would be highly desirable to provide a water-in-oil emulsion having the required ability to invert in sea water or other aqueous solution having high concentrations of salt, which emulsions exhibit a desired fluidity at low temperatures or when subjected to repeated freeze-thaw cycles.

SUMMARY OF THE INVENTION

Accordingly, one aspect of the present invention is an improved water-in-oil emulsion of a water-soluble polymer. Said emulsion comprises a self-inverting water-in-oil emulsion of droplets of an aqueous liquid containing a water-soluble polymer dispersed throughout a continuous oil phase and an amount of an N,N-dialkyl amide, said amount being sufficient to improve the low temperature porperties of the emulsion.

By the term "improve the low temperature properties" it is meant that the dialkyl amide is employed in an amount sufficient to improve the stability of the emulsion when the emulsion is subjected to repeated freeze-thaw cycles and/or to improve the fluidity of the emulsion at low temperatures, (i.e., when the water-in-oil emulsions are subjected to extended periods at $-20°$ C., they remain sufficiently fluid to flow under the force of gravity). The use of the dialkyl amide is particularly advantageous since the dialkyl amide does not significantly effect the overall HLB of the resulting emulsion. Therefore, the water-in-oil emulsions containing the inverting surfactant having the higher HLB value rapidly invert in sea and water of a high concentration of salt.

In general, a desirably high HLB value is imparted to the emulsion by the post-addition of an inverting surfactant. In many cases, the inverting surfactant is not compatible with the emulsion, as evidenced by the formation of gel upon the admixture of the inverting surfactant with the water-in-oil emulsion. This is particularly true with the higher HLB surfactants, i.e., surfactants having an HLB of 12 or more. In such instances, the N,N-dialkyl amide will often improve the compatibility of the inverting surfactant with the emulsion as well as improve the low temperature properties of the resulting emulsion formulation.

DETAILED DESCRIPTION OF THE PREFERRED EMBODIMENTS

Water-in-oil emulsions suitably employed in the practice of the present invention are emulsions in which the dispersed phase is an aqueous phase containing a water-soluble polymer and the continuous phase is a water-immiscible, inert liquid. The ratio of the water phase to the oil phase is suitably any ratio that permits the formation of a stable water-in-oil emulsion. Within this constraint, it is generally desirable to minimize the proportion of the oil phase, thereby maximizing the concentration of the water soluble polymer in the emulsion. For similar reasons, it is generally desirable that the concentration of the water-soluble polymer in the disperse, aqueous phase be as concentrated as possible without appreciably destablizing the water-in-oil emulsion. Preferably, based on the total volume of the water-in-oil emulsion, the disperse, aqueous phase constitutes from 20 to 80, more preferably from 50 to 78, most preferably from 60 to 75, volume percent and the continuous oil phase constitutes from 80 to 20, more preferably from 50 to 22, most preferably from 40 to 25, volume percent. Preferably, the disperse aqueous phase in the water-in-oil emulsion comprises from 35 to 65, more preferably from 40 to 60, most preferably from 40 to 50, weight percent of the water-soluble polymer.

The water-soluble polymers useful herein are characterized by being at least inherently dispersible and preferably soluble in the disperse aqueous phase and insoluble in the water-immiscible, inert liquid of the continuous oil phase of the water-in-oil emulsion. The water-soluble polymers advantageously employed are polymers, both homopolymers and copolymers, of $\alpha,\beta$-ethylenically unsaturated carboxamides; vinyl esters of saturated carboxylic acids such as vinyl acetate and vinyl propionate; $\alpha,\beta$-ethylenically unsaturated carboxylic acids and anhydrides such as acrylic acid, methacrylic acid and maleic anhydride; ethylenically unsaturated sulfonic acids such as vinylbenzyl sulfonic acid; and similar water soluble monomers. In addition to the aforementioned water-soluble comonomers, the water-soluble polymer may optionally contain a minor amount, e.g., up to about 15 mole percent, of a copolymerizable water-insoluble monomer such as a monovinylidene aromatic, e.g., styrene; a vinyl halide, e.g., vinyl chloride or vinylidene chloride; and the like.

In general, the water-soluble polymers useful in preparing the water-in-oil emulsions of the present invention are polymers of an $\alpha,\beta$-ethylenically unsaturated carboxamide wherein at least 15 mole percent of the polymerized monomer units (so-called mers) have pendant carboxamide groups. For the purposes of this invention, the carboxamide group is represented by the formula;

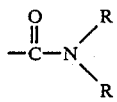

wherein each R is individually hydrogen; alkyl; aminoalkyl, particularly dialkyl aminomethyl; hydroxyalkyl; $-R'-N(R'')^3 X^\ominus$ wherein R' is alkylene, preferably methylene, each R'' is individually hydrogen, alkyl or hydroxyalkyl and $X^\ominus$ is a neutralizing anion such as a chloride, bromide, methylsulfate anion, hydroxide; or an amine substituted ester such as the quaternary ammonium substituted ester of the formula:

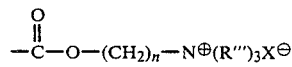

wherein each R''' is individually alkyl and N is an integer from 1 to 4; and the like. Preferably, R is hydrogen or alkyl, most preferably hydrogen.

Preferably, from 50 to 100 mole percent, most preferably from 60 to 100 mole percent of the mers have pendant carboxamide groups. Preferred carboxamide polymers are the polymers of acrylamide and methacrylamide, with the homopolymers of acrylamide and copolymers containing at least 60 mole percent of acrylamide being especially preferred.

Although the molecular weight of the water-soluble polymer is not particularly critical to the practice of the present invention, in general, the water-soluble polymer will have a molecular weight ranging from 10,000 to over 25,000,000, with a weight average molecular weight commonly being in excess of 500,000, more commonly being in excess of 1,000,000.

The continuous oil phase of the emulsion generally comprises a water-immiscible, inert liquid, which is usually an organic liquid such as a liquid hydrocarbon or substituted hydrocarbon liquid. A preferred group of organic liquids are the liquid hydrocarbons having from 4 to 15 carbon atoms including aromatic and aliphatic hydrocarbons and mixtures thereof such as benzene, xylene, toluene, mineral oils, liquid paraffins, e.g., kerosene, naphtha and the like.

Methods for preparing the water-in-oil emulsions of the water-soluble polymers are well-known in the art and reference is made thereto for the purposes of this invention. Illustrative of such techniques are described in U.S. Pat. Nos. 3,284,393; 3,624,019 and 3,734,873, all of which are hereby incorporated by reference. In general, the water-in-oil emulsions are prepared by dispersing an aqueous solution of the monomer in an inert hydrophobic liquid organic dispersing medium containing a sufficient amount of a water-in-oil emulsifying agent (conventionally and hereinafter referred to as a "primary emulsifier") and the resulting emulsion heated under free-radical forming conditions to polymerize the monomer in the disperse phase.

In general, the primary emulsifiers are oil-soluble surfactants which permit the formation of a water-in-oil emulsion. The oil-soluble, primary surfactants generally have a hydrophilic-lipophilic balance (HLB) from 3 to 9, preferably from 4 to 8. McCutecheon's Emulsifiers and Detergents, International Edition, 1981, ppg 248–253 sets forth a number of illustrative examples of surfactants having HLB values within these desired ranges.

Of the surfactants having the desired HLB values, the surfactants advantageously employed as the primary emulsifiers are the anionic and nonionic surfactants. Representative anionic surfactants include the fatty amides (substituted or unsubstituted) wherein the fatty groups contain from 15–22 carbon atoms such as the N,N-dialkanol substituted fatty amides wherein the alkanol group contains 2–6 carbon atoms; the sorbitan derivatives such as sorbitan monoleate and sorbitan monostearate and various alkali metal salts of a long chain carboxylic acid. Representative nonionic surfactants include the condensation products of higher fatty alcohols with a limited number of moles of ethylene oxide; such as the reaction product of a mole of oleyl alcohol or lauryl alcohol with 2 or 3 moles ethylene oxide. The combinations of two or more surfactants may be employed.

Preferably, the emulsifying surfactant is a sorbitan derivative, particularly sorbitan monooleate or a combination thereof with the amide reaction product of oleic acid with isopropanol amine.

The primary emulsifiers are employed in an amount sufficient to form a desirably stable water-in-oil emulsion. In general, such an amount of emulsifying agent is within the range from about 0.1 to about 20, preferably from 1.5 to 3, weight percent based on the weight of the aqueous phase of the water-in-oil emulsion.

Typically, the primary emulsifiers do not give the resulting water-in-oil emulsions a desirable high HLB to self-invert, i.e., the emulsions are not capable of being inverted by the addition of water only, and a so-called "inverting surfactant" is incorporated in the emulsion.

Inverting surfactants are suitably any surfactant which facilitates the inversion of the water-in-oil emulsion upon the dilution of the emulsion in water as evidenced by an increase in the viscosity of the resulting mixture. Specifically, by the term "facilitating the inversion of the water-in-oil emulsion" it is meant that, upon the addition of sufficient amounts of water to invert the emulsion, the water-soluble polymer in the disperse aqueous phase of the water-in-oil emulsion more rapidly becomes dissolved in the continuous water phase than if no inverting surfactant was present. Although any surfactant which facilitates the aforementioned inversion is usefully employed herein, in general, the inverting surfactant will possess an HLB value from 8 to 25. Such inverting surfactants are well known in the art and reference is made thereto for the purposes of this invention. Representative inverting surfactants include certain reaction products of an alkylene oxide such as ethylene or propylene oxide with an alkylated phenol or long chain (e.g., from 6 to 20 carbon atoms) fatty alcohol, fatty acid, alkyl mercaptan or primary amine; the dialkyl diphenol ether sulfonates; and the like.

Of such inverting surfactant, those most advantageously employed will depend on a variety of factors including the individual components of the water-in-oil emulsion, including the primary emulsifier and the specific water-soluble polymer and the like. In general, surfactants having an HLB value from 10 to 20, more preferably from 10 to 20, more preferably from 11 to 18, are employed as the inverting surfactants in the present invention. Preferably, the inverting surfactants are nonionic. More preferably, the inverting surfactants are alkylphenol ethoxylates having 10-16 moles of ethylene oxide per each mole of alkylphenol; and fatty alcohol ethoxylates, particularly linear secondary alcohols having from 11 to 15 carbon atoms with from 9 to 12 moles of ethylene oxide per mole of alcohol being more preferably employed as the inverting surfactants. Most preferably, the inverting surfactant is an octyl or nonylphenol ethoxylate.

The inverting surfactant is employed in an amount sufficient to facilitate the inversion of the water-in-oil emulsion, with the inverting surfactant generally being employed in an amount from 0.1 to 15, preferably from 0.5 to 5, weight percent based on the total weight of the water-in-oil emulsion.

The N,N-dialkyl amides useful in the practice of the present invention are represented by the structural formula:

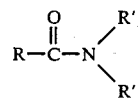

wherein each R is an alkyl, alkenyl, cycloalkyl or aryl group or an inertly substituted alkyl, alkenyl, cycloalkyl or aryl group, or mixture thereof having at least 5 carbon atoms and R' is independently an alkyl group. Preferably, each R' is methyl or ethyl and each R is a straight or branched chain alkyl group having from 5 to 18 carbon atoms. The most preferred N,N-dialkyl amides are represented by the following structural formula:

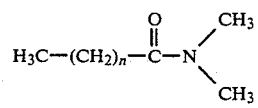

wherein n is an integer from 4 to 16, preferably from 6 to 10.

The N,N-dialkyl amide is employed in an amount sufficient to improve the low temperature properties of the water-in-oil emulsion containing the inverting surfactant.

Specifically, the water-in-oil emulsions may become non-flowable at some temperature above $-25°$ C., a temperature which can be encountered by the water-in-oil emulsion during storage and, in one embodiment of the present invention, the N,N-dialkyl amide is employed in an amount sufficient to render the water-in-oil emulsion containing the inverting surfactant fluid or flowable to a lower temperature than if no dialkyl amide is employed. By the term "fluid" or "flowable" it is meant that the water-in-oil emulsion formulation is rapidly flowable under the force of gravity at the low temperatures. By the term "solid" or "non flowable", it is meant that the formulation is not readily flowable at the lower temperatures. In many cases, the formulation may be a rubbery lump (which does not reverse to a fluid emulsion upon its exposure to room temperatures, i.e., 18°-25° C.) or a non-flowing solid paste (which, upon return to room temperatures, commonly becomes a flowable emulsion again) at these lower temperatures. Preferably, the N,N-dialkyl amide is employed in an amount sufficient to maintain the emulsion as a fluid to temperatures of $-15°$ C., more preferably $-20°$ C., most preferably $-25°$ C.

Alternatively, the water-in-oil emulsion may exhibit gel or skin formation and/or solidification when subjected to repeated cycles of freeze-thaw and, in another embodiment, the N,N-dialkyl amide is employed in an amount sufficient to increase the stability of the water-in-oil emulsion containing the inverting surfactant when the emulsion is subjected to repeated freeze-thaw cycles. Specifically, the N,N-dialkyl amide is employed in an amount sufficient to reduce the amount of gel or skin formation upon exposure of the water-in-oil emulsion to repeated freeze-thaw cycles. (See, or example, the test methods described in Example 1).

In many cases, the emulsion exhibits non-flowable behavior at low temperatures as well as poor performance to repeated freze-thaw cycles and the dialkyl amide is advantageously, but not necessarily, added in an amount sufficient to improve both properties without otherwise significantly and deleteriously affecting the function of the surfactant in the emulsion.

Although the amounts of the N,N-dialkyl amide required to improve the low temperature properties of the water-in-oil emulsion will vary depending on a variety of factors including the specific water-soluble polymer, the other components of the water-in-oil emulsion and the like; the N,N-dialkyl amide is, in general, advantageously employed in amounts from 0.1 to 10, more preferably from 0.5 to 5, weight percent based on the total weight of the water-in-oil emulsion.

In many cases where an inverting surfactant is employed, the inverting surfactant having a desirably high HLB value is not totally compatible with the water-in-oil emulsions as evidenced by the formation of gel upon the addition of the inverting surfactant to the emulsion. Specifically, surfactants having an HLB value of about 12 or more, are often incompatible, to some degree, with the emulsion as evidenced by the fact that gel is formed upon the addition of the inverting surfactant to the water-in-oil emulsion. In general, the use of aforespecified amounts of the N,N-dialkyl amide will improve the compatibility of the otherwise incompatible inverting surfactant in the emulsion.

Preferably, if a normally incompatible inverting surfactant is employed, the N,N-dialkyl amide is employed in an amount to render the surfactant compatible (i.e., soluble or otherwise dispersible as colloidal size particles) as evidenced by there being no gel formation upon the addition of the surfactant to the emulsion which amount also improves the low temperature properties of the emulsion.

In preparing the water-in-oil emulsions of the present invention, the desired amount of the N,N-dialkyl amide, the water-in-oil emulsion and the inverting surfactant, if any, are admixed. When employing a normally insoluble inverting surfactant, an amount of the dialkyl amide sufficient to improve the low temperature properties of the emulsion as well as to render the inverting surfactant sufficiently compatible in the water-in-oil emulsion is advantageously admixed with the inverting surfactant and the resulting admixture subsequently added to the water-in-oil emulsion. Alternatively, the desired amount of the dialkyl amide can be added to the water-in-oil emulsion and the inverting surfactant subsequently added thereto.

When an inverting surfactant which is soluble in the water-in-oil emulsion is employed, the N,N-dialkyl amide can be added prior to, coincident with (as an admixture with the inverting surfactant or as a separate stream) or subsequent to the addition of the inverting surfactant to the water-in-oil emulsion. Preferably, the N,N-dialkyl amide is added as a mixture with the inverting surfactant.

In general, the blending or admixing of the dialkyl amide and inverting surfactant in the water-in-oil emulsion is advantageously conducted using mild agitation sufficient to uniformly disperse, which term includes solubilizing, the inverting surfactant and dialkyl amide in the water-in-oil emulsion. The resulting emulsion is a fluid liquid which can easily be poured or pumped. It can rapidly be converted for use by adding it to an aqueous medium, including an aqueous liquid containing a high concentration of salt, such that it inverts to form an aqueous solution of the water-soluble polymer.

The following examples are set forth to illustrate the invention and should not be construed as limiting its scope. All parts and percentages are by weight unless otherwise indicated.

EXAMPLE 1

A water-in-oil emulsion of a water-soluble polymer comprising, in polymerized form, 70 percent acrylamide and 30 percent acrylic acid is prepared using the polymerization techniques and conditions as described in U.S. Pat. No. 3,284,393. The water-in-oil emulsion comprises 27 percent of a continuous oil phase comprised of Isopar M (a mixture of isoparaffinic hydrocarbons having a flash point of 77° C.) and the oil-soluble primary emulsifiers. The oil-soluble, primary emulsifiers contained by the emulsion are sorbitan monooleate and oleic isopropanolamide. The discontinuous aqueous phase comprises the remainder of the water-in-oil emulsion and is composed of about 40 percent of the water-soluble polymer based on the total weight of the discontinuous aqueous phase.

To a part of the water-in-oil emulsion is added 4 percent, based on the weight of the water-in-oil emulsion, of a mixture containing equal parts of (1) an inverting surfactant of an octylphenol condensed with 16 moles of ethylene oxide per mole of octylphenol (HLB=15.8) and (2) an N,N-dimethyl amide composition comprised of 50 percent N,N-dimethyl caprylamide, 40 percent N,N-dimethyl capramide, 5 percent N,N-dimethyl caproamide and 5 percent N,N-dimethyl lauramide. This addition is conducted using mild agitation. No gel is exhibited upon this addition or the subsequent solubilization of the mixture in the oil phase of the water-in-oil emulsion.

A portion of the resulting water-in-oil emulsion formulation (Sample No. 1) is subjected to three repeated freeze-thaw cycles, each cycle consisting of exposing the formulation for 22 hours to −20° C., followed by exposing the formulation to room temperatures for two hours. The emulsion formulations are inspected at the end of each cycle (i.e., at the end of the thaw portion of each cycle). During each cycle and at the end of the three cycles, the water-in-oil emulsion formulation is found to maintain its fluidity with no gel being formed.

Another portion of the water-in-oil emulsion formulation is tested for its ability to invert in an aqueous solution having a high salt concentration by placing the formulation in synthetic sea water containing an additional 3 percent potassium chloride. The resulting mixture formed a good initial dispersion. This dispersion is mildly agitated using a paddle stirrer for thirty minutes and at the end of this period, the viscosity increase of the salt water containing the emulsion is measured using a Brookfield RVT viscometer with Spindle No. 1 at 100 rpm and found to be 35 centipoise.

COMPARATIVE EXAMPLE 1

To a second portion of the water-in-oil emulsion is added 2 percent, based on the weight of the water-in-oil emulsion, of the inverting surfactant of the dioctylphenol/ethylene oxide condensation product (no dialkyl amide is employed therewith). Significant amounts of small gel particles are noted upon the addition of the inverting surfactant to the water-in-oil emulsion. Upon evaluating a portion of the resulting formulation's resistance to repeated freeze-thaw cycles by the aforedescribed testing methods, the formulation was found to become a rubbery lump during the freeze portion of the first cycle. The emulsion remains as a lump upon return to room temperature.

EXAMPLE 2

In a manner similar to that of Example 1, a series of water-in-oil emulsion formulations (Sample Nos. 2-4, respectively) are prepared by adding 2, 3 and 5 percent, based on the weight of the water-in-oil emulsions, of a mixture containing equal parts of the octylphenol ethoxylate inverting surfactant and the N,N-dialkyl amide to separate portions of the water-in-oil emulsion. Each of the samples is formulated without the formation of any gel particles, thereby indicating that the N,N-dialkylamide has made it possible to effectively solubilize the otherwise incompatible inverting surfactant, at various concentrations, in a water-in-oil emulsion.

Moreover, when a portion of each of the resulting emulsion formulations is subjected to three repeated freeze-thaw cycles, all formulations remained fluid (i.e., flowable) throughout. Specifically, no gel particles are found in the formulation containing 2 or 3 percent of the surfactant/dialkyl amide mixture. The formulation containing 5 percent of the mixture exhibits slight gel formation during the freeze portion of the second and third cycle but remains fluid throughout the testing.

Upon the addition of another portion of each formulation to a separate synthetic sea water solution containing an additional 3 percent potassium chloride, all the formulations form a good initial dispersion.

Although emulsion formulations having excellent low temperature properties can be prepared using 1 percent of the surfactant/dialkyl amide mixture, the formulation does not exhibit viscosity increase upon inversion.

An emulsion formulation can also be prepared using 6 percent of the surfactant/dialkylamide mixture. However, the resulting emulsion quickly inverts without the addition of more water and subsequently gelled into a rubbery mass without exposure to low temperatures.

COMPARATIVE EXAMPLE 2

Several water-in-oil emulsion formulations (Sample Nos. 2a, 3a, 4a and 5a) are prepared by the addition of 1, 1.5, 2.5 and 3 percent, based on the total weight of the water-in-oil emulsion, of the octylphenol ethoxylate inverting surfactant to separate portions of the water-in-oil emulsion. Regardless of the amount of the inverting surfactant being added to the emulsion, a significant number of small gel particles are formed upon the preparation of each emulsion formulation. In addition, when subjected to repeated freeze-thaw cycles, all formulations become solid (non-flowable) at the lower temperature. On reverting to room temperature, the emulsion formulation containing 1 percent of the inverting surfactant (Sample No. 2a) exhibited small gel particles in the first and subsequent cycles. The emulsion formulation containing 1.5 percent of the inverting surfactant (Sample No. 3a) was also fluid at room temperature but exhibited larger gel lumps at the lower temperature during the second and third cycles. The formulations containing 2.5 and 3 percent of the inverting surfactant (Sample Nos. 4a and 5a, respectively) remained non-flowable (a rubbery lump) after the freeze portion of the first cycle and did not thereafter become fluid.

EXAMPLE 3

In a manner similar to Examples 1 and 2, several water-in-oil emulsion formulations (Sample Nos. 6-14) are prepared by the addition of an admixture comprising equal parts of the inverting surfactant specified in the accompanying Table I and the N,N-dimethyl caprylamide/capramide composition to a water-in-oil emulsion. Several other water-in-oil emulsion formulations are prepared by adding the various inverting surfactant specified in the accompanying Table I (no dialkyl amide is employed). These emulsion formulations are designated Sample Nos. 6A-14A. Each of the formulations is subjected to three repeated freeze-thaw cycles. The condition of each emulsion formulation on initial mixing and after each freeze-thaw cycle of the subsequent freeze-thaw testing are recorded in the accompanying Table I.

TABLE I

| Sample No. | INVERTING SURFACTANT (1) | | | N,N—diakylL compatability | | (FREEZE-THAW EVALUATION (4)) | | |
|---|---|---|---|---|---|---|---|---|
| | Type | HLB | Amount, % | Amide (2) | (3) | 1st cycle | 2nd cycle | 3rd cycle |
| 6 | 9N9 | 12.9 | 3 | yes | yes | fluid | fluid | fluid |
| 6A* | 9N9 | 12.9 | 3 | no | yes | nearly solid | solid | solid |
| 7 | 9N10 | 13.3 | 2.5 | yes | yes | fluid | fluid | fluid |
| 7A* | 9N10 | 13.3 | 2.5 | no | slt. gel | gel | solid | solid |
| 8 | 9N10 | 13.3 | 3 | yes | yes | fluid | fluid | fluid |
| 8A* | 9N10 | 13.3 | 3 | no | slt. gel | nearly solid | solid | solid |
| 9 | X-114 | 12.4 | 3 | yes | yes | fluid | fluid | slt. gel |
| 9A* | X-114 | 12.4 | 3 | no | yes | slt. gel | gel | gel |
| 10* | 15S9 | 13.5 | 1 | yes | yes | fluid | slt. gel | fluid-skin |
| 10A* | 15S9 | 13.5 | 1 | no | yes | fluid | slt. gel | fluid-skin |
| 11 | 15S9 | 13.5 | 2 | yes | yes | slt. gel | slt. gel | fluid-skin |
| 11A* | 15S9 | 13.5 | 2 | no | yes | fluid | slt. gel | gel |
| 12 | 15S9 | 13.5 | 3 | yes | slt. gel | fluid-skin | fluid-skin | slt. gel |
| 12A* | 15S9 | 13.5 | 3 | no | slt. gel | solid | solid | solid |
| 13 | DN14 | 13 | 1 | yes | slt. gel | slt. gel | slt. gel | slt. gel |
| 13A* | DN14 | 13 | 1 | no | slt. gel | slt. gel | solid | solid |
| 14* | DN14 | 13 | 3 | yes | gel | solid | solid | solid |
| 14A* | DN14 | 13 | 3 | no | gel | solid | solid | solid |

*not an example of the present invention.
(1) The type of surfactant is expressed in abbreviated form wherein:
9N9 = a nonylphenyl (9) ethoxylate sold as Dowfax 9N9 by The Dow Chemical Company
9N10 = a nonylphenyl (10) ethoxylate sold as Dowfax 9N10 by the Dow Chemical Company
X-114 = an octyl phenol ethoxylate sold as Triton X-114 by Rohm & Haas
15S9 = an alcohol ethoxylate sold as Tergitol 15S9 by B.P. Chemicals
DN14 = an alcohol ethoxylate sold as Triton DN-14 by Rohm & Haas and the amount is the percentage of the inverting surfactant employed based on the total weight of the water-in-oil emulsion.
(2) The dialkyl amide is employed, in equal weight parts with the inverting surfactant when "yes" is indicated and is not employed when "no" is indicated.
(3) Compatibility refers to the amounts of gel formed upon the addition of the inverting surfactant to the water-in-oil emulsion with
"yes" = the inverting surfactant is totally compatible with the emulsion
"slt. gel" = a limited number of small gel particles are formed
"gel" = a larger number of generally larger size gel particles are formed.
(4) Freeze-thaw testing is conducted by the methods described in Example 1. Examination of the samples after each freeze-thaw cycle (i.e., after the thaw portion of each cycle just prior to subjecting the sample to the freeze portion of the next cycle) is determined and the condition indicated wherein:
"fluid" = a fluid formulation having no gel
"skin" = a fluid formulation exhibiting some skin
"slt. gel" = a generally fluid formulation having slight gel
"gel" = a formulation which is still fluid but having more gel and generally larger gel particles.
"solid" = non-flowable formulation.

As evidenced by the data in Table I, the performance of the formulations is dependent on the specific inverting surfactant employed and the concentration of inverting surfactant and the dialkyl amide in the formulations. In general, the water-in-oil emulsion formulations of the present invention which contain a combination of an inverting surfactant and dialkyl amide exhibit better low temperature properties, i.e., better stability when subjected to repeated freeze-thaw cycling. This is particularly true for the alkylphenol ethoxylate type inverting surfactants. In those cases where the N,N-dialkyl amide does not significantly improve the low temperature properties of the emulsion, it is believed that the concentration of the surfactant is too high and/or concentration of the dialkyl amide too low. The N,N-dialkyl amide was not found to improve the low temperature properties or compatibility of emulsions containing 3, 4 or 5 percent, based on the weight of the emulsion, of a Na-dioctylsulphosuccinate inverting surfactant Sample Nos. 15–17 when employed at equal concentrations at the inverting surfactant.

EXAMPLE 4

A water-in-oil emulsion is prepared in a manner similar to that used in the preparation of the water-in-oil emulsion employed in Example 1, except, following preparation, a mixture of sodium carbonate and sodium bisulfate is post added to the emulsion. To different portions of the resulting emulsion are added equal parts of the various inverting surfactants set forth in the accompanying Table II and an N,N dialkyl amide (Sample Nos. 18–22).

For purposes of comparison, to other portions of the resulting emulsion are added the various inverting surfactants set forth in the accompanying Table II (no N,N-dialkyl amide being employed, Sample Nos. 18A–22A).

TABLE II

| Sample No. | INVERTING SURFACTANT (1) | | | DIALKYL AMIDE COMPATIBILITY (2) | |
|---|---|---|---|---|---|
| | Type | HLB | Amount | Yes | No |
| 18 | X-165 | 15.8 | 2 | x | yes |
| 18A* | X-165 | 15.8 | 2 | x | gel |
| 19 | X-102 | 14.6 | 1.5 | x | yes |
| 19A* | X-102 | 14.6 | 1.5 | x | gel |
| 20 | X-100 | 13.5 | 2 | x | yes |
| 20A* | X-100 | 13.5 | 2 | x | gel |
| 21 | 9N10 | 13.3 | 2.5 | x | yes |
| 21A* | 9N10 | 13.3 | 2.5 | x | gel |
| 22 | 9N9 | 12.9 | 3 | x | yes |
| 22A* | 9N9 | 12.9 | 3 | x | gel |

(1) Same as Footnote 1 in Table I with
X-165 = octylphenol (16) ethoxylate available from Rohm & Haas
X-102 = octylphenol (12-13) ethoxylate available from Rohm & Haas
X-100 = octyl phenol (9-10) ethoxylate available from Rohm & Haas
(2) Same as Footnote 3 in Table I.

When a portion of each emulsion formulation is subjected to three repeated freeze-thaw cycles, the formulations referred to in Table II as Sample Nos. 18, 19 and 20 which contain the inverting surfactant and a dialkyl amide remained fluid throughout the testing. Alternatively, the formulations, identified as Sample Nos. 18A, 19A and 20A which contain only the inverting surfactant, became solid or nearly solid during the first cycle, with all formulations becoming solid and not reverting to a fluid during the thaw portion of the second freeze-thaw cycle. Although small amounts of gel were noted during the first and subsequent freeze-thaw cycles in the formulations identified as Sample Nos. 21 and 22 which contain the N,N-dialkyl amide in addition to the inverting surfactant, the formulations Sample Nos. 21A and 22A which contain no dialkyl amide are solid during all three freeze-thaw cycles.

When another portion of each emulsion formulation is subjected to $-20°$ C., the emulsion formulations containing the inverting surfactant and the dialkyl amide (Sample Nos. 18–22) remain fluid whereas the emulsion formulations containing only the inverting surfactant (Sample Nos. 18A–22A) become an irreversible rubbery lump.

EXAMPLE 5

A series of water-in-oil emulsion formulations (Sample Nos. 23–30) are prepared by admixing separate portions of a water-in-oil emulsion identical to that employed in Example 4 with equal parts of an inverting surfactant of an octylphenol (16) ethoxylate having a calculated HLB value of 15.8 and the N,N-dialkyl amide specified in Table III.

For purposes of comparison, water-in-oil emulsion formulations (Sample Nos. 23A, 24A and 25A) are prepared by adding, to the water-in-oil emulsion, 1, 2 and 3 percent based on the weight of the water-in-oil emulsions, of the octylphenol (16) ehtoxylate inverting surfactant without the aid of the dialkyl amide.

The incompatibility of the surfactant in each of the water-in-oil emulsions is observed. In addition, each of the formulations is subjected to freeze-thaw testing. The ability of each formulation to invert upon the addition of the emulsion formulations to distilled water and sea water having an additional 3 percent potassium chloride is also determined. The results of this testing are summarized in the accompanying Table III.

TABLE III

| Sample No. | N,N—Dialkyl Amide (1) | | Gel Formation (2) | Freeze-Thaw Evaluation (3) | | | Inversion (4) | |
|---|---|---|---|---|---|---|---|---|
| | Type | Amount | | 1st cycle | 2nd cycle | 3rd cycle | distilled water | sea water |
| 23 | $M_{12}$ | 1 | n.g. | fluid | fluid | fluid | poor | poor |
| 24 | $M_{12}$ | 2 | n.g. | fluid | fluid | slt. gel | fair-ppt. | fair |
| 25 | $M_{12}$ | 3 | n.g. | slt. gel | slt. gel | gel | fair-ppt. | fair-ppt. |
| 26 | $M_{18}$ | 1 | n.g. | fluid | fluid | fluid | poor | poor |
| 27 | $M_{18}$ | 2 | n.g. | fluid | fluid | fluid | poor | poor |
| 28 | $M_{18}$ | 3 | n.g. | fluid | fluid | fluid | good | fair |
| 29 | $M_{18}$ | 4 | n.g. | slt. gel | slt. gel | slt. gel | good-ppt. | good-ppt. |
| 30 | $M_{18}$ | 5 | n.g. | skin | skin | skin | good-ppt. | good-ppt. |
| 23A* | — | — | gel | slt. gel | slt. gel | gel | — | — |
| 24A* | — | — | gel | solid | solid | solid | — | — |

TABLE III-continued

| Sample No. | N,N—Dialkyl Amide (1) | | Gel Formation (2) | Freeze-Thaw Evaluation (3) | | | Inversion (4) | |
|---|---|---|---|---|---|---|---|---|
| | Type | Amount | | $1^{st}$ cycle | $2^{nd}$ cycle | $3^{rd}$ cycle | distilled water | sea water |
| 25A* | — | — | gel | solid | solid | solid | — | — |

*Not an example of the present invention
(1) The type of N,N—dialkyl amide is given in abbreviated form with $M_{8-10}$ = mixture of N,N—dimethyl caprylamide (50%): N,N—dimethyl capramide (40%) N,N—dimethyl capriamide (5%); N,N—dimethyl lauramide (5%) sold as Hallcomid ™ $M_{8-10}$ by the C.P. Hall Co.
$M_{12}$ = N,N—dimethyl lauramide (95%) amide sold as Hallcomid ™ $M_{12}$ by the CP Hall Co.
$M_{18}$ = N,N—dimethyl oleamide (80%) amide sold as Hallcomid ™ M18-OL by the CP Hall Co.
(2) Same as Footnote 3 in TABLE I
(3) Same as Footnote 4 in TABLE I
(4) Inversion relates to the ability of the emulsion to invert (before freezing) as evidenced by separation or precipitation of the polymer from the aqueous medium upon its addition to water and the viscosity increase of the resulting mixture with:
poor = little viscosity increase within 30 minutes after the addition of the emulsion formulation to the distilled or sea water,
fair = fair dispersion accompanied by little or some viscosity increase 30 minutes after inversion,
fair-ppt. = same as fair except some to most of the polymer precipitates from solution upon inversion,
good = a good dispersion usually accompanied by a corresponding viscosity increase thirty minutes after addition of the emulsion formulation to the distilled water or sea water.
good-ppt. = same as good except some polymer lumps are noted upon inversion.
For practical reasons, those emulsion formulations which can not be formulated without gel formation are not tested for their ability to invert.

As evidenced by the data presented in Table III, the formulations containing the inverting surfactant and any of the various, specified dialkyl amides exhibit essentially no gel formation upon the addition of the otherwise incompatible inverting surfactant to the water-in-oil emulsion. Alternatively, when the inverting surfactant is added to the emulsion without the dialkyl amide, gel formation is noted.

Moreover, when subjected to repeated freeze-thaw cycles, the emulsion formulations of the present invention which contain the combination of a dialkyl amide and the inverting surfactant show generally better performance than those formulations containing only the inverting surfactant.

A series of emulsion formulations identical to Sample No. 30 except containing, as the inverting surfactant, a nonylphenol (9) ethoxylate sold as Dowfax 9N9 by The Dow Chemical Company, a nonylphenol (10) ethoxylate sold as Dowfax 9N10 by the Dow Chemical Company or an octylphenol ethoxylate solid as Triton X-114 by Rohm & Haas exhibit similarly improved performance.

COMPARATIVE EXAMPLE 3

Butanol, which is known to be capable of coupling alkylphenol ethoxylate surfactants having high HLB values in aliphatic oils is mixed, at equal parts, with Triton X-165 inverting surfactant. This mixture is found to be soluble in kerosene, an oil commonly employed in the preparation of water-in-oil polymeric emulsions. However, when the mixture of the inverting surfactant and butanol is added to the water-in-oil polymeric emulsion prepared by the techniques described in Example 1, immediate and significant gel formation was exhibited.

COMPARATIVE EXAMPLE 4

A mixture of a sorbitan monooleate surfactant available available as Span 80 from Atlas Chemie and having a relatively low HLB value (HLB=4.3) is mixed with equal parts of Triton X-165 inverting surfactant. Several emulsion formulations are prepared from an emulsion identical to the emulsion employed in preparing Sample No. 1 by adding various amounts of a mixture of equal parts of the inverting surfactant and the lower HLB surfactant (2, 4, 6 and 8 percent based on the total weight of the water-in-oil emulsion). No gel formation is evidenced upon the addition of the mixture of the emulsion. When subjected to extended periods at low temperatures of −20° C., all the emulsion formulations solidified. Moreover, when subjected to three repeated freeze-thaw cycles, each of the resulting emulsion formulations although becoming non-fluid during the freeze portion, reverted to a fluid with no gel formation being when evidenced. However, due to the relatively low HLB value of the emulsion, no viscosity increase was noted upon the addition of these emulsions to either distilled water or sea water containing an additional amount of potassium chloride.

COMPARATIVE EXAMPLE 5

Similar results as obtained in Comparative Example 4 are obtained when mixtures containing equal amounts of the inverting surfactant and a diethanolamide of $C_{15}$-$C_{22}$ fatty acids are added to the water-in-oil emulsion at concentrations of 2, 4, 6 or 8 percent based on the weight of the water-in-oil emulsion. Specifically, no gel formation is noted upon the addition of the mixture to the emulsion and the resulting emulsion formulation remains fluid with no gel formation when subjected to three repeated freeze-thaw cycles. However, no viscosity increase was noted thirty minutes after initial addition of the emulsion to the distilled water or sea water.

COMPARATIVE EXAMPLE 6

When from 1 to 6 percent based on the weight of the emulsion of a mixture of equal parts of lauryl alcohol, a known coupling agent, and the inverting surfactant employed in Comparative Example 4 are added to the water-in-oil emulsion identical to that of Example 1, no gel formation is exhibited. Although resulting formulations solidify at the lower temperatures encountered during the freeze portion of each freeze-thaw cycle, they revert to fluids upon reexposure to room temperatures. However, a relatively poorer inversion and lower increases in viscosity are experienced due to the low HLB of the formulations. Similarly, poorer invertibility is exhibited by an emulsion having from 1 to 6 weight percent of a mixture of equal parts lauryl alcohol and an octylphenol ethoxylate sold as Triton X-114 by Rohm and Haas added thereto.

COMPARATIVE EXAMPLE 7

An emulsion formulation prepared by the addition of 0.5 percent of the N,N-dialkyl amide of Example 1 to a water-in-oil emulsion identical to that of Example 1 does not visibly affect the emulsion. However, upon extended exposure to temperatures of −20° C., the formulation solidifies. Similar results are obtained with emulsion formulations prepared from 1 to 3 percent of the dialkyl amide.

EXAMPLE 6

A water-in-oil emulsion of a water-soluble polymer comprising, in polymerized from, 25.5 percent acrylamide and 74.5 percent of a quaternized dimethylamino ethylmethacrylate is prepared using the polymerization techniques and conditions as described in U.S. Pat. No. 3,284,393. The water-in-oil emulsion comprises 27 percent of a continuous oil phase comprised of Isopar M (a mixture of isoparaffinic hydrocarbons having a flash point of 77° C.) and oil soluble, primary emulsifiers. The oil-soluble, primary emulsifiers contained by the emulsion are sorbitan monooleate, an alcohol (7) ethoxylate and the reaction production of oleic acid with isopropanolamine. The discontinuous aqueous phase comprises the remainder of the water-in-oil emulsion and is composed of about 57 percent of the water-soluble polymer based on the total weight of the discontinuous aqueous phase.

A series of water-in-oil emulsion formulations are prepared by adding separate portions of the water-in-oil emulsion 3, 4, 5.6 and 6 percent, based on the weight if the water-in-oil emulsions, of a mixture containing equal parts of (1) an inverting surfactant of an octylphenol condensed with 16 moles of ethylene oxide per mole of octylphenol and (2) an N,N-dimethyl amide composition comprised of 50 percent N,N-dimethyl caprylamide, 40 percent N,N-dimethyl capramide, 5 percent N,N-dimethyl caproamide and 5 percent N,N-dimethyl lauramide. This addition is conducted using mild agitation. No gel is exhibited upon the preparation of the emulsion formulations.

A portion of each of the resulting water-in-oil emulsion formulations is subjected to three repeated freeze-thaw cycles. Although the emulsion formulation containing 3 percent of the surfactant/N,N-dialkyl amide solidified during the freeze cycle, upon subsequent thawing to room temperature, the emulsion formulation reverted to a stable water-in-oil emulsion which exhibits no gel particles. The emulsion formulations having the higher amounts of the mixture are all fluid throughout the three freeze-thaw cycles.

What is claimed is:

1. A water-in-oil emulsion composition comprising a self-inverting water-in-oil emulsion of a water-soluble polymer having an amount of an N,N-dialkyl amide of the formula:

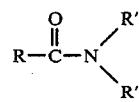

wherein R is alkyl, alkenyl, cycloalkyl, aryl or inertly substituted alkyl, alkenyl, cycloalkyl or aryl having at least 5 carbon atoms and each R' is independently an alkyl, said amount being sufficient to improve the low temperature properties of the emulsion such that the emulsion is flowable at a lower temperature than if no N,N-dialkyl amide was employed or the emulsion is more stable when subjected to freeze thaw cycles than if no N,N-dialkyl amide was employed.

2. The water-in-oil emulsion of claim 1 wherein the composition further comprises an inverting surfactant.

3. The water-in-oil emulsion of claim 2 wherein the N,N-dialkyl amide is of the formula:

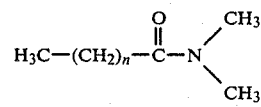

and n is an integer from 4 to 16.

4. The water-in-oil emulsion of claim 3 wherein n is from 4 to 10.

5. The water-in-oil-emulsion of claim 3 wherein the N,N-dialkyl amide is employed in an amount from 0.2 to 20 weight percent based on the weight of the water-in-oil emulsion.

6. The water-in-oil emulsion of claim 3 wherein the water-soluble polymer is a polymer, either homo- or copolymer, of an α,β-ethylenically unsaturated carboxamide and the inverting surfactant is a surfactant having an HLB from 8 to 25 and is employed in an amount from 0.1 to 15 weight percent based on the weight of the water-in-oil emulsion.

7. The water-in-oil emulsion of claim 5 wherein the inverting surfactant has an HLB from 10 to 20, the water-soluble polymer is a homopolymer of acrylamide or a copolymer derived from at least 60 mole percent of acrylamide and the N,N-dialkyl amide and inverting surfactant are each employed in an amount from 0.5 to 5 weight percent based on the weight of the water-in-oil emulsion.

8. The water-in-oil emulsion of claim 7 wherein the dialkyl amide is employed at the same concentration as the inverting surfactant.

9. The water-in-oil emulsion of claim 7 wherein the water-in-oil emulsion constitutes from 20 to 80 volume percent of the disperse, aqueous phase and from 80 to 20 volume percent of the continuous oil phase.

* * * * *